INVENTOR
ARNE JOHAN SVENSSON
BY Hane and Nydick
ATTORNEYS

Oct. 27, 1970 A. J. SVENSSON 3,536,850

CORD CIRCUIT ARRANGEMENT FOR OFFICE TELEPHONE SYSTEMS

Filed May 16, 1967 2 Sheets-Sheet 2

INVENTOR
ARNE JOHAN SVENSSON
BY Hane and Nydick
ATTORNEYS 3,536,850
CORD CIRCUIT ARRANGEMENT FOR OFFICE TELEPHONE SYSTEMS Arne Johan Svensson, Johanneshov, Sweden, assignor to Telefonaktiebolaget L M Ericsson, Stockholm, Sweden, a corporation of Sweden Filed May 16, 1967, Ser. No. 638,869
Claims priority, application Sweden, June 7, 1966, 7,754/66
Int. Cl. H04m 5/04
U.S. Cl. 179—27 2 Claims

ABSTRACT OF THE DISCLOSURE

A two-wire trunk line circuit arrangement for use in office telephone systems of the kind comprising groups of telephones wherein each group has a main telephone and a number of secondary telephones and wherein connections are established by means of individual push-buttons located at the main telephone for selectively connecting the main telephone to the secondary telephones through a single cord circuit. The cord circuit has two series connected capacitors in each line branch for separating the current feeding circuits for the main telephone and the secondary telephones. A rectifier is connected across the line of each cord circuit between said series connected capacitors.

Figure 1:
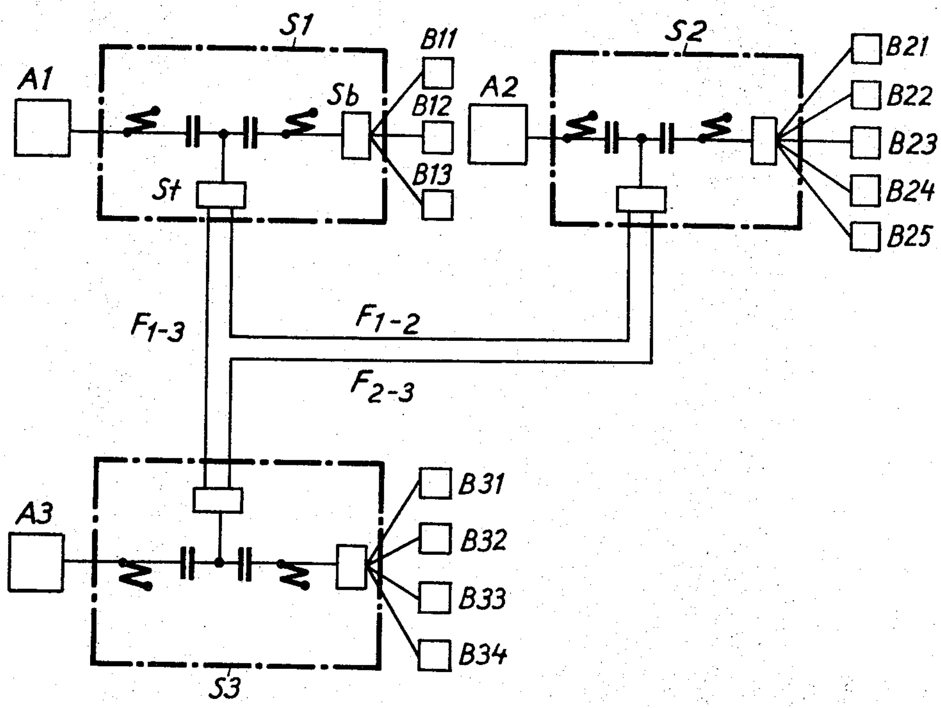

A trunk line between two such cord circuits is at each end provided with a push-button or similar manual connecting means, connecting in its inactive position a signal means for incoming calls to the trunk line and in its active position (outgoing call) connecting the rectifier across the line.

The present invention refers to a cord circuit arrangement for office telephone systems of the kind comprising groups of telephones wherein each group has a main telephone and a number of secondary telephones to which the main telephone may be selectively connected. The connection is effected by manually actuable connection means, for instance push buttons, provided at the main telephone, and there is also provided a number of equal connection means that give the possibility of making calls through trunk lines to other main telephones within the system. These systems usually have the facility of so-called conference communications, i.e. the possibility of connecting simultaneously a plurality of telephones, main telephones and secondary telephones to a common conversation circuit. Because the system is designed only for communications from (and eventually to) the main telephone, only one cord circuit is required for each main telephone. The cord circuit is designed for separate current feeding to the main telephone and to the secondary telephone. The individual lines to the different telephones are made as two-wire lines, so that standard instruments may be used.

In the known systems, however, special arrangements are required for the establishment of the connections between the main telephones through the trunk lines. The trunk lines may be connected to the cord circuits in the same way as the lines of the secondary telephones in which case a special, more or less complicated, relay set has to be used. A communication established between two main telephones passes through both cord circuits of the main telephones which cord circuits together with the relay set of the trunk line give a relatively high attenuation. To avoid this the trunk lines have to be provided with additional wires, which however is a big disadvantage.

The cord circuit arrangement according to the invention is an improvement compared to the known cord circuits as it avoids these disadvantages. The attenuation is as low in a communication between two main telephones as in a communication between a main telephone and a secondary one. No relay sets are required and furthermore the signalling means for making calls through trunk lines is very simple. This is achieved by the introduction of two series connected capacitors in each line branch for separation of the feeding current circuits of the cord circuit, and by each one of the talking or speech wires of the trunk line being connected to the corresponding wires of the cord circuit at a point between these series connected capacitors. The speech wires of the trunk line are joined through a rectifier. A connection means for the trunk line is provided at the main telephone which in an inactive condition connects a signal means for incoming calls to the trunk line and in actuated condition (outgoing call) connects the rectifier in the loop of the trunk line.

Figure 2:
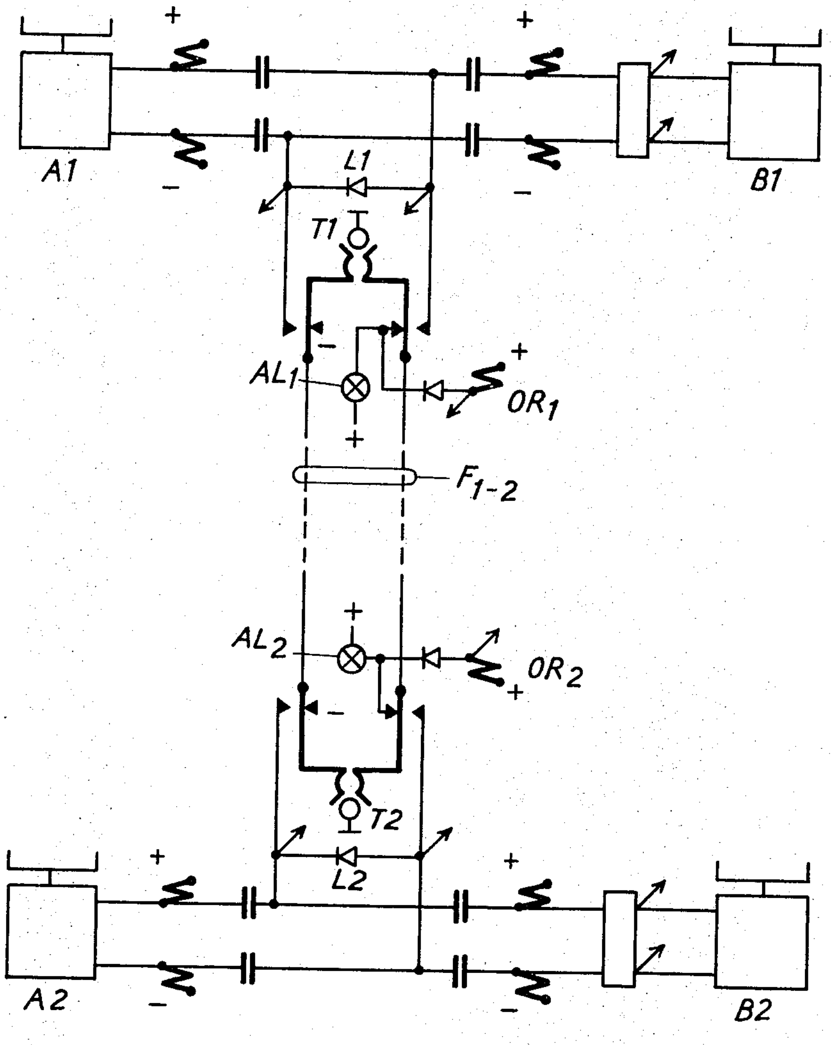

The invention will be further described by means of an embodiment with reference to the accompanying drawing, in which FIG. 1 shows in diagrammatical form the lay-out of the telephone system, and FIG. 2 shows a connection diagram for a trunk line between two cord circuits.

The system shown in FIG. 1 comprises three groups of telephones, the speech circuits between these telephones being symbolically indicated in the figure by means of single lines although they, in reality, are two-wire lines. The first group comprises a main telephone A1 and secondary telephones B11–B13, the second one a main telephone A2 and secondary telephones B21–B25 and the third one a main telephone A3 and secondary telephones B31–B34. Each group is provided with an identical cord circuit S1, S2 and S3. Each cord circuit has separate current feeding circuits for A- and B-telephones and comprises connection means *Sb* and *St* respectively. The connecting means may consist of, for instance push-buttons, for connecting the secondary telephones, respectively, to the trunk lines F ($F_{1-3}$, $F_{1-2}$) which run to the other cord circuits.

In FIG. 2 there are shown two cord circuits and a trunk line provided between them for CB-signalling and two way traffic. The cord circuits connect the respective main telephones A1 and A2 to secondary telephones B1 and B2. The feeding circuits are, in both cord circuits, separated by means of series connected capacitors in each line branch and the talking circuit is overbridged between the capacitors by means of a rectifier L1 and L2 respectively. The rectifiers L1 and L2 are also connected to the outer contacts of the push-buttons T1 and T2 respectively. Positive and negative potential is connected to the inner contacts of these buttons. The positive potential is connected through calling lamps AL1 and AL2 which are connected in parallel to observation relays OR1 and OR2, respectively. The trunk line is connected to the change contacts of the push buttons.

When a call is made from one of the main telephones, for instance from telephone A1, to the other, the push button T1 is actuated. Thus current is connected from positive and negative at the button T2 through the trunk line and through the rectifier L1 causing the lamp AL2 to be ligted. The telephone A2 answers by pressing the button T2, whereby the current through the trunk line is interrupted.

Because the trunk line has no current during conversation, the rectifiers connected across the line have very high resistance and do not give any attenuation of the speech. When calling, the resistance of the rectifiers connected in the loop is, on the contrary, practically zero, which is of advantage considering the simplicity of the arrangement that can be used for signalling the call—in the shown embodiment a glow lamp.

I claim:

1. An office telephone system comprising at least two groups of telephones, each group of telephones having a main telephone and at least one secondary telephone, said telephones of each group being connected by a pair of line branches, each of said line branches including a pair of serially connected capacitors, a rectifier means interconnecting the junctions of said capacitors in each pair of branch lines, a two-wire trunk line extending between said two groups of telephones, and a manually operable two-position connecting means associated with each group of telephones, each of said two-position connecting means including a signal means, and each of said connecting means including switching means which when said two-position connecting means is in a first position connects the associated signal means to said two-wire trunk line and when in a second position connects the associated rectifier means across the two wires of said two-wire trunk line.

2. The system of claim 1 wherein each of said switching means is a two-position switching means comprising first and second pairs of fixed contacts and a pair of movable contacts so ganged that when said switching means is in a first position each of said movable contacts is connected to a different one of the contacts of said first pair of fixed contacts and when said switching means is in a second position each of said movable contacts is connected to a different one of the contacts of said second pair of fixed contacts and wherein each of said signal means includes a two-terminal current operated signalling device, and further comprising for each of said two-position connecting means a current source means connected to one terminal of said signalling device, means for connecting the other terminal of said signalling device to one contact of said first pair of fixed contacts, a current return connected to the other contact of said first pair of fixed contacts, means for connecting each contact of said second pair of fixed contacts to a different junction of the junctions of said pairs of capacitors, and means for connecting each of said movable contacts to a different one of the wires of said two-wire trunk line.

References Cited

UNITED STATES PATENTS 2,327,851 8/1943 Bascom et al.

KATHLEEN H. CLAFFY, Primary Examiner

T. W. BROWN, Assistant Examiner

U.S. Cl. X.R.

179—84